Patented Oct. 12, 1954

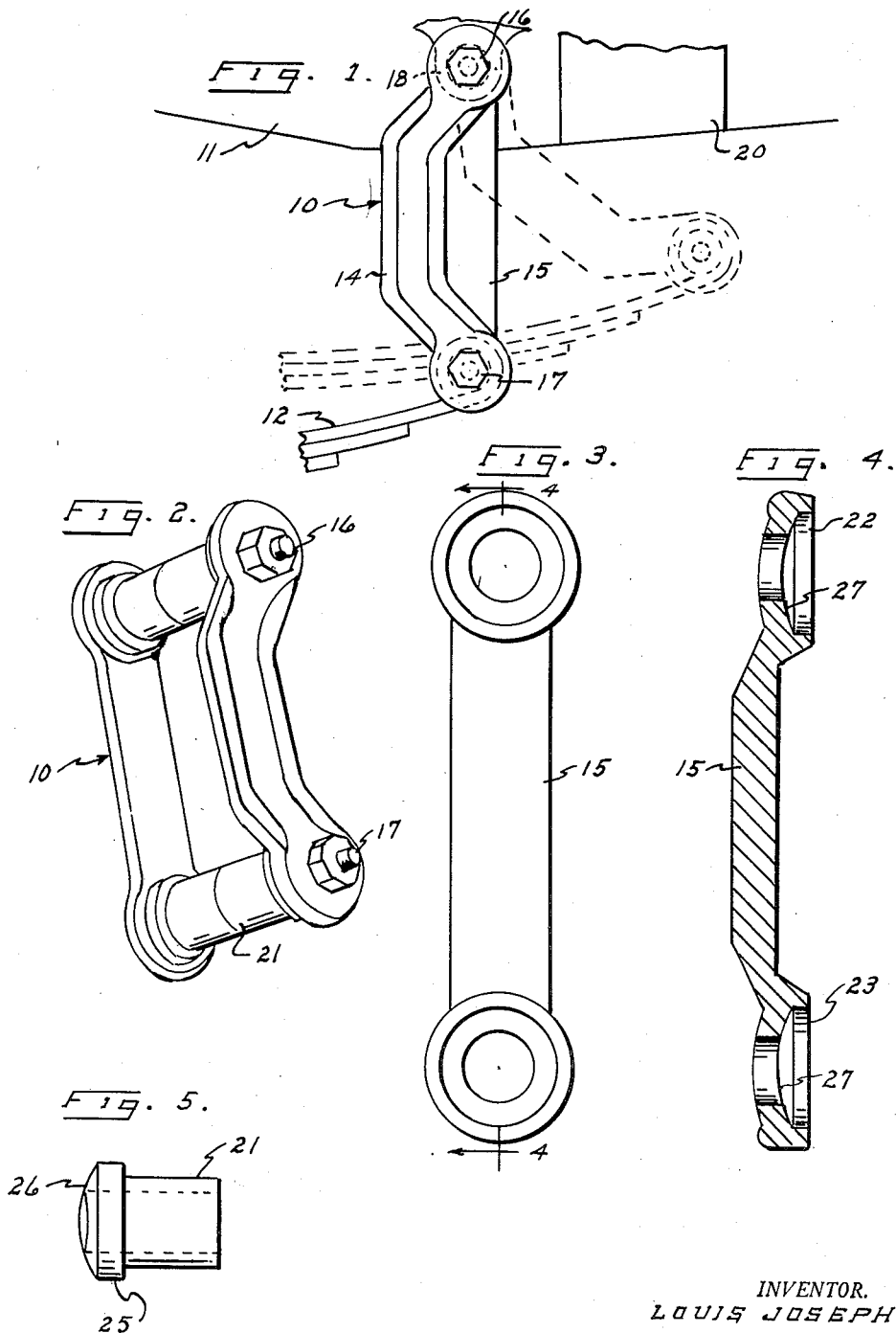

2,691,520

UNITED STATES PATENT OFFICE 2,691,520

SHACKLE

Louis Joseph, Brooklyn, N. Y.

Application September 17, 1949, Serial No. 116,330

2 Claims. (Cl. 267—54)

1

This invention relates to oil-less spring shackles and more particularly to the oscillating connection between the spring and the frame of a motor vehicle.

An oil-less spring shackle depends upon the elasticity of the rubber insert to permit a limited amount of oscillating movement with the flexing of the spring that is attached to one end of the shackle joint and likewise the rubber insert at the opposite end of the shackle permits a limited degree of oscillating movement while attached to the frame of the motor vehicle. The rubber inserts are fitted between the supporting bushing and the shackle oscillating members and the shackle members are necessarily drawn tightly together to retain the rubber tightly encased to prevent the extrusion of the rubber under load stress. In the past many of the oil-less bearings have shown a great deal of wear on the surface of the rubber inserts as well as on the surface adjacent to the supporting bushing. This is mainly due to the inability of the mechanic to draw the shackle into a tight relationship to prevent the oscillating movement of the shackle with relation to the face of the inserts. Likewise, where an insert becomes worn with the continuous frictional sliding movement of a metal face against a rubber face, the loose condition is aggravated and the stresses become unbalanced and permit the supporting bushing to wear the insert at the particular area where the most stress exists in use. The rubber insert may be rotated under these conditions and becomes so worn and weakened that it is no longer serving the purpose for which it was intended and under extreme conditions may tear or rupture to the point where the shackle bolt and bushing will make contact and thus defeat the whole purpose of the oil-less bearing.

It is an object of this invention to provide an oil-less shackle joint that is so designed that the joint may be properly fitted and drawn up tightly to retain the rubber inserts in a proper condition throughout the life of the shackle.

A further object of this invention is to provide an oscillating shackle joint in which the inner shackle member is shaped to permit a full movement of the shackle without interference with the frame of the motor vehicle.

A still further object of this invention is to provide both supporting plates of a shackle joint with cupped shaped faces on one side at either end thereof to receive and retain the concave shaped faces of the rubber inserts utilized in the shackle joint.

A further object of this invention is to provide rubber insert members for an oil-less bearing in which the one end is provided with a shoulder of a diameter greater than the body of the insert member and in which the end face of the shoulder portion is formed as a convex surface to mate with the concave surface of the shackle plates.

Other objects of this invention may be apparent by reference to the accompanying detailed description and the drawings in which Fig. 1 illustrates a shackle embodying this invention, Fig. 2 is a perspective view of the shackle, Fig. 3 is a front elevational view of one shackle plate, illustrating a further embodiment, Fig. 4 is a cross sectional view taken on line 4—4 of Fig. 3, and Fig. 5 is a side elevational view of a rubber insert.

Referring to Fig. 1 there is illustrated a shackle joint 10 that is attached to a motor vehicle frame 11 and a spring 12. The shackle is composed of two plate members 14 and 15 that are connected at either end by means of a pair of bolts 16 and 17. The motor vehicle frame is provided with a bushing supporting member 18 and the shackle plates 14 and 15 are mounted either side of the bushing supporting member 18 so that the bolt 16 may be passed through both shackle plates and the bushing supporting member to retain the shackle as illustrated. Likewise the plates 14 and 15 are mounted either side of the end of the spring 12 so that the bolt 17 may be passed through both plate members and the end of the spring to retain the shackle as illustrated. Thus it is apparent that with the normal flexing of spring 12 as illustrated in dotted lines, the shackle 10 will be moved in an oscillating manner between the position illustrated in full lines and the position illustrated in dotted lines. It is to be noted that the plate member 14 is so designed that it is provided with the same structural strength as the plate member 15 although the plate member 14 is formed with a considerable offset from the central axis of the two supporting ends. The offset shape of plate 14 permits the shackle 10 to be mounted on motor vehicles having a cross member 20 that would normally interfere with the full movement of the shackle as illustrated in dotted lines. Since the plate 15 is normally mounted on the outer face of the shackle there is no interference and it may remain perfectly straight as illustrated. But, plate 14 is necessarily formed as illustrated to permit the full flexing of the spring without having any interference such as contact with the cross member 20.

Referring to Fig. 2, there is illustrated a further embodiment of this invention in which the shackle 10 is illustrated as the oil-less type of shackle in which rubber insert members 21 (as illustrated in Fig. 5) are utilized. In this embodiment two rubber inserts are positioned in abutting relation to present the larger shoulder end at either side thereof to be fitted into the cupped shaped face at either end of the plate members. The bolts 16 and 17 are then inserted through the center of the component parts and may be tightly drawn to retain the inserts 21 in a tight gripped relationship. In Fig. 2 we have illustrated the complete assembled shackle but it is to be understood that this shackle in use would be fitted into the supporting bushing 18 (Fig. 1) at one end thereof while the opposite end would normally be fitted into the end of spring 12 and in this mounted relationship the bolts 16 and 17 may then be drawn up tightly as when the bolts are tightened the rubber inserts will be encased by the plates at either end thereof and the bushing structure in one case and the spring structure in the other to prevent the rubber from being extruded under the compressive force exerted by tightening of the bolt members. The object of a proper fitting is to clamp the rubber inserts so tightly that the oscillating movement of the shackle is obtained in the flexing of the rubber rather than permitting any movement of the metal faces with relation to the rubber face of the insert.

Referring to Figs. 3 and 4 the plate member 15 illustrates the cupped formation of the ends 22 and 23 of the plate member. Similarly the plate 14 will be formed with the same cupped shaped ends. The cupped ends are formed to permit the shoulder 25 of the insert 21 to fit snugly therein and the convex face 26 of the insert 21 to mate with the concave face 27 of the cupped end 22 or 23. Thus with the inserts mounted as illustrated in Fig. 2 the tightening of the bolts 16 and 17 will produce a compression between the plate members 14 and 15 that is completely transferred to the inserts 21. This compressive stress will not tend to extrude the face of the insert to deform that face due to the shoulder 25 of the insert being retained within the cupped formation of the plate. It is apparent that with the shackle mounted as illustrated in Fig. 1 that a maximum stress may be produced in tightening the bolts 16 and 17 to in turn form an expansion of the body of the insert within the bushing bore or the spring bore to produce a maximum frictional gripping relationship between the metal face of the bore and the exterior rubber face of the insert. Likewise the concave face of the plate members produces a maximum frictional grip with the convex face of the insert members to thus retain the oil-less shackle in a tight gripping relationship with the bushing support at one end thereof and the spring support at the other end thereof so that the normal flexing of the spring and oscillation of the shackle will produce all of the stressing in the rubber inserts and prevent the wear that is normally produced by the slippage of the inserts in the oscillating movement of the shackle. Fig. 4 also illustrates a further embodiment of this invention in which portion 15 is offset outwardly from the central axis of the shackle to thus provide further clearance during its normal flexing movement when mounted to a chassis and spring.

Various changes and modifications may be made in the formation of the plate members of the shackle or in the configuration of the cupped ends of the plate members wihout departing from the spirit of this invention and this invention shall be limited only by the appended claims.

What is claimed is:

1. In an oil-less shackle connection for a half elliptic spring, the combination of a frame eye, a spring eye, a plurality of rubber bushings to fit said eyes, an inner and outer shackle plate and a pair of threaded bolts and nuts, said plates formed with apertures at either end to receive said bolts, said inner shackle plate formed with an offset body portion lying outside the plane through the axes of said apertures but parallel to said plane, said rubber bushings formed in halves to be inserted from either side of the eye into which they are mounted, said rubber inserts each provided with an enlarged collared outer end and the outer face of said collared end formed in a convex shape, said shackle plates formed at each of their ends with an enlarged circular cutout portion of a diameter slightly greater than the diameter of the collar of said rubber insert and the inner face of said cutout portion formed in a concave shape to mate with the convex face of said rubber bushing insert, and means to compress said rubber inserts with said bolts to force the rubber to be extruded into a tight gripping relationship with the internal surface of the enlarged circular cutout portion of said shackle plates.

2. In an oil-less shackle connection for a half elliptic spring, the combination of a frame eye, a spring eye, a plurality of rubber bushings to fit said eyes, an inner and outer shackle plate and a pair of threaded bolts and nuts, said plates formed with apertures at either end to receive said bolts, said inner shackle plate formed with an offset body portion lying outside the plane through the axes of said apertures but parallel to said plane, said rubber bushings formed in halves to be inserted from either side of the eye into which they are mounted, said rubber inserts each provided with an enlarged collared outer end and the outer face of said collared end formed in a convex shape, said shackle plates formed at each of their ends with an enlarged cupped shaped portion of a diameter slightly greater than the diameter of the collar of said rubber insert, said bolts passed through the center of said bushings and the apertures in the parallel ends of said shackle plates to retain the component parts in a set relationship, and means to compress said rubber inserts with said bolts to force the rubber to be extruded into a tight gripping relationship with the internal surface of the eye and with the abutting cupped shaped surfaces of the end portions of the shackle plates into which the bushing is positioned.

References Cited in the file of this patent

UNITED STATES PATENTS

| Number | Name | Date |
| --- | --- | --- |
| 34,858 | Farrell | Apr. 1, 1862 |
| 506,546 | Robb | Oct. 10, 1893 |
| 1,185,378 | Crawford | May 30, 1916 |
| 1,570,522 | Patterson | Jan. 19, 1926 |
| 1,704,834 | Jansson | Mar. 12, 1929 |
| 1,920,558 | Henry | Aug. 1, 1933 |
| 2,274,513 | Baker | Feb. 24, 1942 |
| 2,467,548 | Bradley | Apr. 19, 1949 |

FOREIGN PATENTS

| Number | Country | Date |
| --- | --- | --- |
| 527,780 | Great Britain | Oct. 10, 1940 |

OTHER REFERENCES

Publication on "Majestic Universal Compressed Rubber Curved Bar Type Spring Shackle Assemblies" by Leterston Sales Co., 2 pages.